(12) United States Patent
Suzuki et al.

(10) Patent No.: US 7,825,556 B2
(45) Date of Patent: Nov. 2, 2010

(54) STEPPING MOTOR

(75) Inventors: Yuzuru Suzuki, Kitasaku-gun (JP); Takayuki Yamawaki, Kitasaku-gun (JP); Hiroyuki Furusaki, Kitasaku-gun (JP); Masaki Kagawa, Kitasaku-gun (JP)

(73) Assignee: Minebea Co., Ltd., Nagano (JP)

( * ) Notice: Subject to any disclaimer, the term of this patent is extended or adjusted under 35 U.S.C. 154(b) by 239 days.

(21) Appl. No.: 11/979,818

(22) Filed: Nov. 8, 2007

(65) Prior Publication Data

US 2009/0066196 A1 Mar. 12, 2009

(30) Foreign Application Priority Data

Nov. 28, 2006 (JP) .............................. 2006-320214
Dec. 26, 2006 (JP) .............................. 2006-350038

(51) Int. Cl.
*H02K 37/12* (2006.01)

(52) U.S. Cl. ..................... 310/90; 310/49.01; 310/49.25

(58) Field of Classification Search ............... 310/49 R, 310/90, 49.01–49.55
See application file for complete search history.

(56) References Cited

U.S. PATENT DOCUMENTS

| | | | |
|---|---|---|---|
| 3,999,090 A * | 12/1976 | Sinnott | 310/49.03 |
| 4,559,461 A * | 12/1985 | Takahashi et al. | 310/49.07 |
| 7,015,604 B2 * | 3/2006 | Iwase et al. | 310/49.36 |
| 7,095,148 B2 * | 8/2006 | Mayumi | 310/90 |
| 7,348,696 B2 * | 3/2008 | Sonohara et al. | 310/49.08 |
| 2004/0263006 A1 | 12/2004 | Iwase et al. | |
| 2006/0097592 A1 * | 5/2006 | Sumi | 310/90 |
| 2007/0253652 A1 * | 11/2007 | Shishido et al. | 384/107 |

FOREIGN PATENT DOCUMENTS

| | | |
|---|---|---|
| JP | A 8-149784 | 6/1996 |
| JP | A 2003-333794 | 11/2003 |
| JP | A 2004-336841 | 11/2004 |
| JP | A 2006-254557 | 9/2006 |

* cited by examiner

*Primary Examiner*—Quyen Leung
*Assistant Examiner*—Terrance Kenerly
(74) *Attorney, Agent, or Firm*—Oliff & Berridge, PLC (57) ABSTRACT

A stepping motor includes: a stator which includes a cup-like first (outer) yoke having a plurality of notches formed at its bottom plate, a second (inner) yoke, and a bobbin having a coil wound therearound and housed in the annular hollow space formed by the first and second yokes; and a pair of bearings each of which includes a hollow-cylindrical main body and a flange structure having a plurality of protrusions, and is attached to the stator such that the protrusions engage with the notches of the first yoke thereby preventing the bearing from rotating relative to the first yoke, and such that the protrusions make contact with a flange of the bobbin thereby precisely positioning the bearing relative to the first yoke with respect to the axial direction, which prohibits any portions of the bearing from protruding axially outwardly beyond the bottom plate of the first yoke.

9 Claims, 9 Drawing Sheets

STEPPING MOTOR

BACKGROUND OF THE INVENTION

1. Field of the Invention

The present invention relates to a stepping motor, and more specifically to a PM (permanent magnet) type stepping motor.

2. Description of the Related Art

Figure 12:
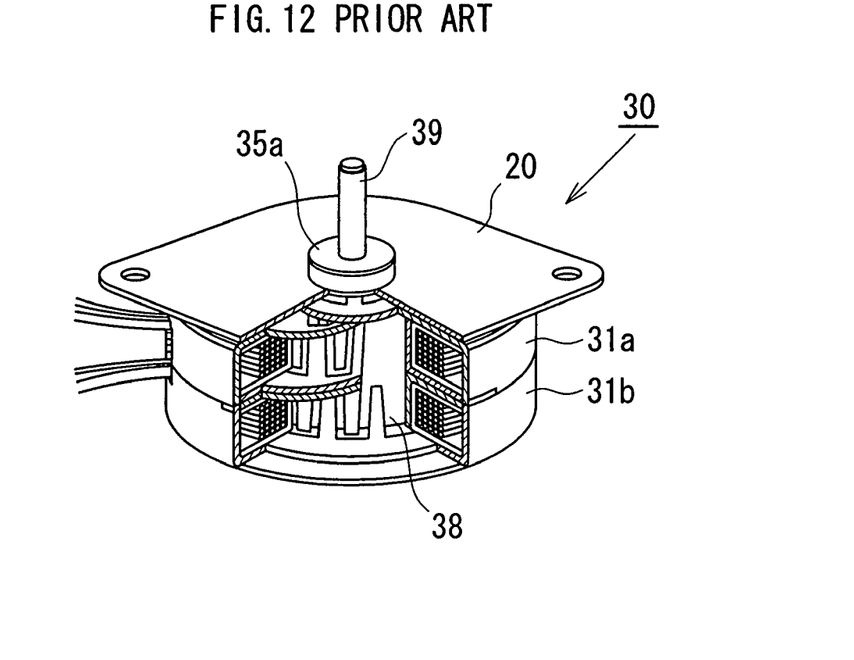
FIG. 12 is a partly cutaway perspective view of a conventional stepping motor.
Figure 13:
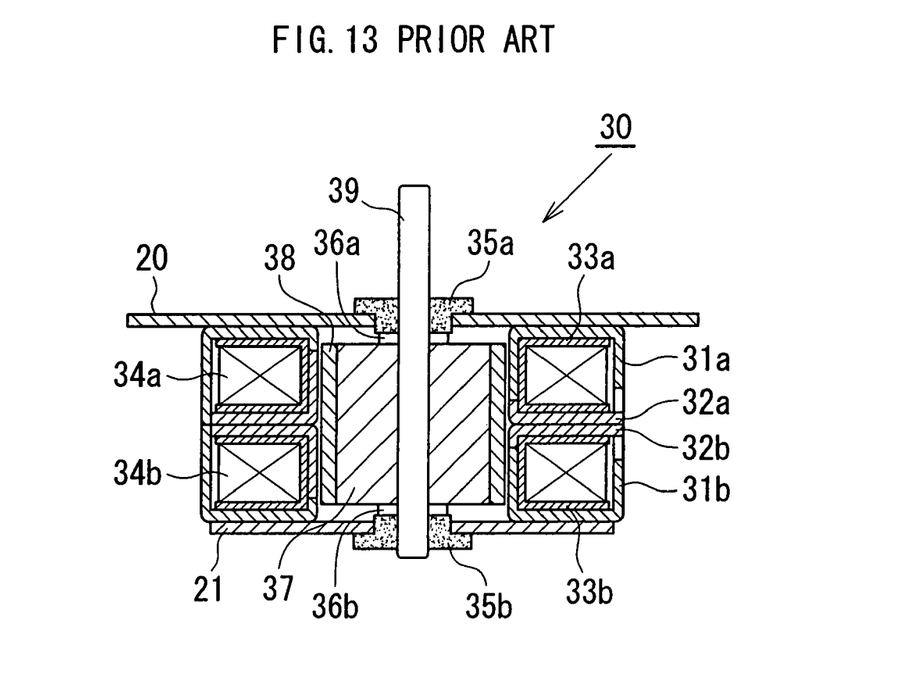
FIG. 13 is a schematic cross sectional view of the stepping motor of FIG. 12.

FIGS. 12 and 13 are respectively partly cutaway perspective and cross sectional views of a conventional PM stepping motor 30.

The PM stepping motor (hereinafter referred to as "stepping motor" as appropriate) 30 includes a stator assembly composed of first and second stators fixedly attached to each other. The first stator includes a bobbin 33a, a coil 34a wound around the bobbin 33a, and first (outer) and second (inner) yokes 31a and 32a disposed to house the bobbin 33a and the coil 34a, and the second stator includes a bobbin 33b, a coil 34b, and first and second yokes 31b and 32b (outer and inner yokes) disposed to house the bobbin 33b and coil 34b.

The stepping motor 30 also includes a rotor assembly composed of a ring magnet (permanent magnet) 38 multipole-magnetized at its circumference, a rotor sleeve 37 fixedly disposed inside the ring magnet 38, and a rotary shaft 39 fixedly inserted through the rotor sleeve 37.

A front plate 20 is fixedly attached to the axially outer side (the first yoke 31a) of the first stator, and a front bearing 35a to rotatably support the rotary shaft 39 of the rotor assembly is fixedly attached to the front plate 20, while a rear plate 21 is fixedly attached to the axially outer side (the first yoke 31b) of the second stator, and a rear bearing 35b to rotatably support the rotary shaft 39 is fixedly attached to the rear plate 21. Thus, the rotary shaft 39 of the rotor assembly is rotatably supported by the front and rear bearings 35a and 35b, whereby the magnet 38 and the rotor sleeve 37 mounted on the rotary shaft 39 are adapted to rotate in a cylindrical hollow space formed in the stator assembly. The stepping motor 30 further includes front and rear spacers 36a and 36b having slidability.

A plurality of pole teeth are formed extending from the first yoke 31a/31b so as to intermesh with a plurality of pole teeth formed extending from the second yoke 32a/32b. The pole teeth are located close to the outer circumference of the magnet 38. When a pulse voltage is applied to the coils 34a and 34b, a magnetic field is produced at each pole tooth of the first and second yokes 31a and 32a and the first and second yokes 31b and 32b, and a driving force to rotate the rotary assembly is generated by the magnetic field produced at the pole tooth and the magnetic field of the magnet 38.

Since the stepping motor 30 includes the front plate 20 with the front bearing 35a and the rear plate 21 with the rear bearing 35b as described above, the axial dimension of the body section of the stepping motor 30 is inevitably increased by the aggregate thickness of the front and rear plates 20 and 21. So, if the stepping motor 30 has an upper limit to the axial dimension of its body section, the ratio of the volume of the coils 34a and 34b relative to the axial dimension of the body section is decreased, resulting in restriction of its output torque. Also, since the front plate 20 functions as a motor attachment plate and has its configuration modified according to customers' specifications, different production procedures are required for the different configurations of the front plate 20, which makes it difficult to standardize the production procedure, and the motor structure as well.

To deal with the problem described above, a stepping motor is disclosed in which front and rear bearings are attached directly to the inner circumferences of first yokes without using front and rear plates (refer to, for example, Japanese Patent Application Laid-Open No. 2006-254557; page 3 and FIG. 1 therein).

Figure 14:
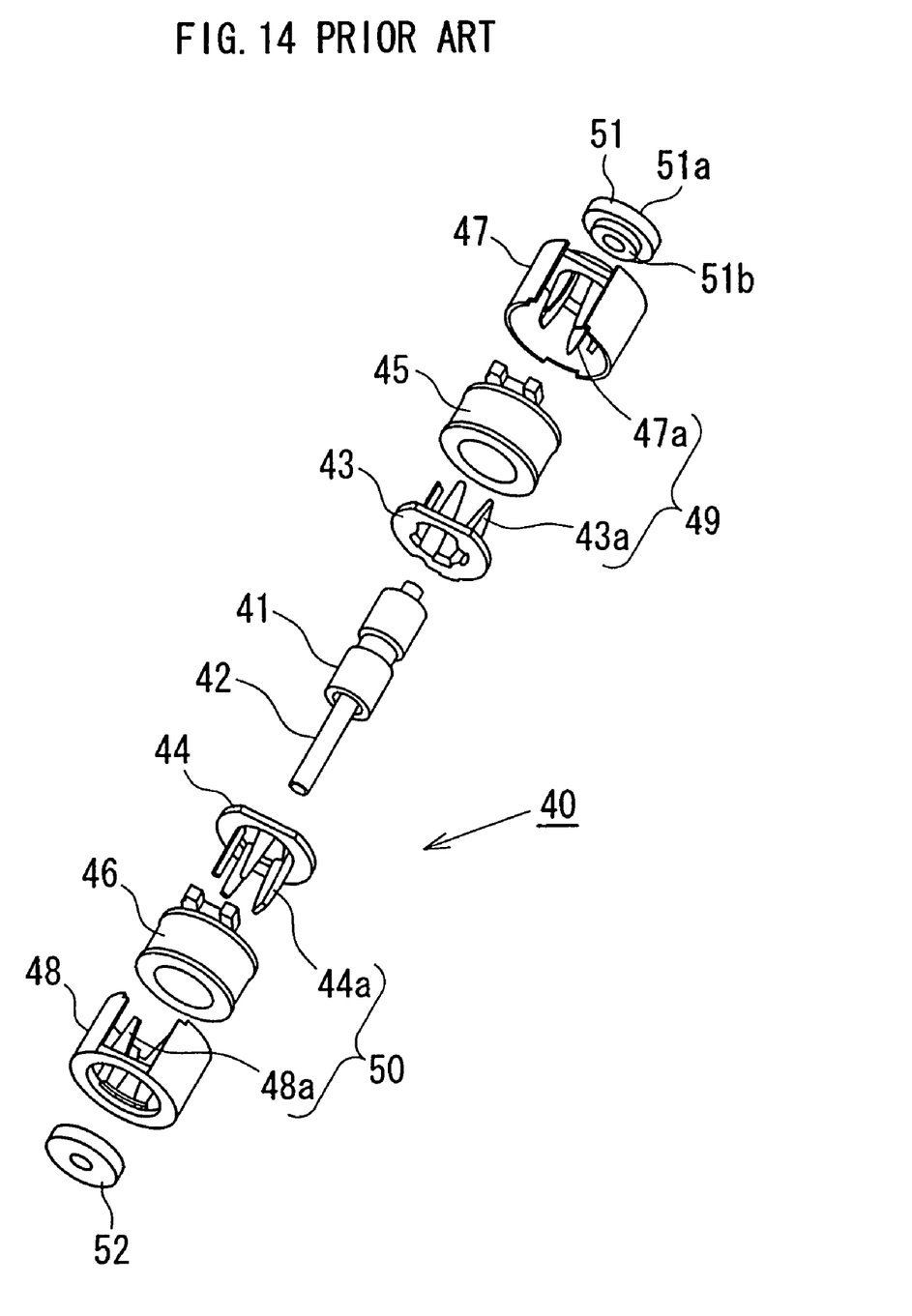
FIG. 14 is an exploded perspective view of another conventional stepping motor.

FIG. 14 shows a stepping motor 40 which eliminates front and rear plates as described above. The stepping motor 40 includes: a rotor assembly composed of a rotor magnet (twin magnets) 41 and a rotary shaft 42; and a stator assembly made up of two stators 49 and 50 each of which is composed of an first yoke 47/48 made of a soft magnetic material and having pole teeth 47a/48a arrayed circumferentially, a second yoke 43/44 made of a soft magnetic material and having pole teeth 43a/44a arrayed circumferentially, and an exciting coil 45/46. And, the stepping motor 40 further includes sintered oil-impregnated bearings 51 and 52 fixedly attached respectively to the first yokes 47 and 48 and adapted to rotatably support the rotary shaft 42.

Referring to FIG. 14, the bearing 51 is made up of two portions, specifically a base portion 51a having a large diameter and a boss portion 51b having a small diameter. The bearing 52 has the same structure as the bearing 51 (though not revealed in the figure). The bearings 51 and 52 are fixedly attached respectively to the first yokes 47 and 48 such that the boss portions 51b and 52b are engagingly inserted into the circular hollow spaces defined by the inner circumferences of the first yokes 47 and 48, and such that the base portions 51a and 52a are brought into contact with the axially outer faces of the first yokes 47 and 48 thus properly fixing the axial position.

When an axial load is applied to the rotary shaft 42, or an external impact is accidentally given to the stepping motor 40, it can possibly happen that the bearings 51 and 52 come off the first yokes 47 and 48. Also, even if an adhesive is applied between the bearings 51 and 52 and the first yokes 47 and 48, the bearings 51 and 52 still can possibly come off the first yokes 47 and 48 due to the deterioration of the adhesive resulting from time and temperature changes.

To overcome the coming-off problem, the bearings 51 and 52 may be made of a sintered oil-impregnated iron material, engagingly inserted into the open spaces inside the first yokes 47 and 48, and securely fixed to the first yokes 47 and 48 by welding. However, the stepping motor 40 still has the following disadvantage.

The bearing 51/52, when duly attached to the first yoke 47/48, protrudes axially for the thickness of the base portion 51a/52a thus increasing the axial dimension of the stepping motor 40. The smaller the outer diameter of the stepping motor 40 is, the larger the ratio of the diameter of the base portion 51a/52a of the bearing 51/52 becomes with respect to the outer diameter of the stepping motor 40. Consequently, if the axial dimension of the stepping motor 40 is subject to restriction, the ratio of a volume occupied by the coil 45/46 relative to the axial dimension of the body section is small thus making it difficult to provide a sufficient motor torque as in the stepping motor 30 of FIGS. 12/13.

SUMMARY OF THE INVENTION

The present invention has been made in light of the above problems, and it is an object of the present invention to provide a stepping motor in which the ratio of a volume occupied for a coil is raised in relation to the motor axial dimension thereby maximally increasing the motor torque when the stepping motor has an upper limit to its axial dimension, In order to achieve the object described above, according to an aspect of the present invention, a stepping motor includes [A] a stator which includes: a first yoke having a cup-like configuration comprising a hollow cylinder wall and a bottom plate to cover one end of the hollow cylinder wall, wherein the bottom plate has a circular opening formed at its center, has a plurality of pole teeth formed along the circumference of the circular opening and extending axially parallel to the hollow cylinder wall, and has a plurality of notches formed to extend radially outwardly from the circumference of the circular opening, each of the notches being located between two adjacent pole teeth; a second yoke having a plurality of pole teeth disposed to intermesh with the plurality of pole teeth of the first yoke on the same circumferential plane, wherein the second yoke, together with the first yoke, forms an annular hollow space; a coil; and a bobbin having the coil wound therearound and housed in the annular hollow space formed by the first and second yokes, [B] a rotor which is rotatably disposed in a cylindrical hollow space enclosed by the plurality of pole teeth of the stator, and which includes a shaft, and a magnet fixed on the shaft, and [C] a pair of bearings which are disposed to sandwich the magnet of the rotor, and each of which is attached to the first yoke of the stator, wherein the bearing includes a hollow-cylindrical main body, and a flange structure having a plurality of protrusions to extend radially outwardly, to engage with the plurality of notches of the bottom plate of the first yoke, and to be disposed in contact with the bobbin.

Since the plurality of protrusions (rather than a single protrusion) of the bearing engage with the plurality of notches (rather than a single notch) of the bottom plate of the first yoke, the bearing can be reliably prevented from rotating relative to the first yoke, and since the plurality of protrusions (rather than a single protrusion) of the bearing, which engage with the plurality of notches of the bottom plate of the first yoke, make contact with the bobbin housed in the annular hollow space formed by the first and second yokes, it is reliably ensured that the bearing can be precisely positioned relative to the first yoke with respect to the axial direction.

In the aspect of the present invention, the main body of each of the pair of bearings may have its outer diameter so determined as to engagingly fit in the circular opening of the bottom plate of the first yoke, and the protrusions of the flange structure of each bearing may have a thickness either equal to or smaller than the thickness of the bottom plate of the first yoke and be disposed either flush with or above the axially outer end face of the main body whereby any portions of the bearing are prohibited from protruding axially outwardly beyond the bottom plate of the first yoke when the protrusions of the bearing are disposed in contact with the bobbin.

Since the main body of the bearing is engagingly fitted in the circular opening of the first yoke lined with the plurality of pole teeth, the bearing can be stably held with respect to the first yoke. Also, when the protrusions of the bearing engage with the notches of the bottom plate of the first yoke, it is ensured that any portions of the main body and the flange structure of the bearing do not protrude axially outwardly beyond the outer face of the bottom plate of the first yoke while the bearing is prevented from rotating relative to the first yoke and at the same time is precisely positioned with respect to the axial direction. Consequently, the axial dimension of the annular hollow space formed by the first and second yokes can be increased, and therefore the ratio of the volume occupied by the coil to be housed in the annular hollow space can also be increased thus increasing a magnetomotive force, which results in an increased motor torque.

In the aspect of the present invention, the main body of one of the pair of bearings may have its outer diameter so determined as to engagingly fit in the circular opening of the bottom plate of the first yoke, and the protrusions of the flange structure of the one bearing may have a thickness either equal to or smaller than the thickness of the bottom plate of the first yoke and be disposed either flush with or above the axially outer end face of the main body of the one bearing whereby any portions of the one bearing are prohibited from protruding axially outwardly beyond the bottom plate of the first yoke when the protrusions of the one bearing are disposed in contact with the bobbin, and wherein the main body of the other of the pair of bearings may have its outer diameter so determined as to engagingly fit in the circular opening of the bottom plate of the first yoke, the protrusions of the flange structure of the other bearing may have a thickness either equal to or smaller than the thickness of the bottom plate of the first yoke, and the main body of the other bearing may have its axial dimension so determined that the axially outer end face of the main body of the other bearing is caused to protrude axially outwardly beyond the bottom plate of the first yoke when the protrusions of the other bearing are disposed in contact with the bobbin.

Since the one bearing is configured such that any portions of the main body and the flange structure do not protrude axially outwardly beyond the bottom plate of the first yoke when the protrusions of the flange structure of the bearing engage with the notches of the bottom plate of the first yoke, the ratio of the volume occupied by the coil can be increased, and on the other hand, since the other bearing is configured such that a portion of the main body protrudes axially outwardly beyond the bottom plate of the first yoke when the protrusions of the flange structure of the bearing engage with the notches of the bottom plate of the first yoke, a motor mounting plate with a predetermined shape can be set on the first yoke in place with reference to the protruding portion of the main body thus allowing the motor mounting plate to be attached after the stepping motor is completed, which enables the production procedure for a motor to be standardized regardless of various mounting plates in different shapes, and also the motor structure to be standardized.

In the aspect of the present invention, the main body and the flange structure of the bearing may be formed discretely from each other such the main body is made of a sintered oil-impregnated alloy, and that the flange structure further includes an annulus to engage the main body and is made of a steel material.

Since the main body and the flange structure of the bearing are produced separately from each other, the optimum production methods can be available for the respective portions of the bearing. The main body made of a sintered oil-impregnated alloy surely provides lubricity for rotating the rotary shaft, wherein a sintered oil-impregnated copper alloy, for example, is superior to a sintered oil-impregnated iron alloy when it comes to reducing the sliding noises of the rotary shaft. If the flange structure is made using an iron steel as a material, then the bearing can be easily and securely welded to the first yoke made of an iron steel material.

In the aspect of the present invention, the main body and the flange structure of the bearing may be formed into an integral body made of a sintered oil-impregnated iron alloy.

Thanks to the integration of the main body with the flange structure, the number of components can be reduced. Also, the bearing made of a sintered oil-impregnated iron alloy can be easily and firmly welded to the first yoke made of an iron steel material.

In the aspect of the present invention, the main body and the flange structure of the bearing may be formed discretely from each other such that the main body is made of a sintered oil-impregnated alloy, and that the flange structure further includes an annulus to engage the main body, is made of a resin material by resin molding, and united with the main body when resin molded Since the main body is made of a sintered oil-impregnated alloy, sufficient lubricity for rotating the rotary shaft can be provided, wherein a sintered oil-impregnated copper alloy, for example, is superior to a sintered oil-impregnated iron alloy in reducing the sliding noises of the rotary shaft. On the other hand, the flange structure made of a resin material by resin molding can be produced with a reduced variation in configuration, and the protrusions of the flange structure made of a resin material cover up the notches of the bottom plate of the first yoke thereby reliably preventing foreign materials such as dusts from coming in the stator.

In the aspect of the present invention, the main body and the flange structure of the bearing may be formed discretely from each other such that the main body is made of a sintered oil-impregnated alloy, and that the flange structure further includes an annulus to engage the main body and is made of a thin steel sheet having a spring force, and a circle formed by circularly connecting the distal end points of the protrusions of the flange structure of the bearing may have a slightly larger diameter than a circle formed by circularly connecting the bottom end points of the notches of the bottom plate of the first yoke.

Since the main body is made of a sintered oil-impregnated alloy, sufficient lubricity for rotating the rotary shaft can be provided, wherein a sintered oil-impregnated copper alloy, for example, is superior to a sintered oil-impregnated iron alloy in reducing the sliding noises of the rotary shaft compared. On the other hand, since the flange structure including an annulus to engage the main body is made of a thin steel sheet having a spring force, and since the protrusions of the flange structure have a slightly larger radial dimension than the notches of the bottom plate of the first yoke, the protrusions are deformed to firmly engage with the notches when the bearing is attached to the first yoke, and the deformed protrusions function like braces (elastic deformation state) when an radial outward force is applied to the bearing, whereby the bearing is prevented from coming off the first yoke without using any jointing methods, for example welding, therebetween.

In the aspect of the present invention, the protrusions of the flange structure of the bearing may have a shape identical with the shape of the notches of the bottom plate of the first yoke.

With this structure, when the protrusions of the flange structure of the bearing engage with the notches of the bottom plate of the first yoke, the notches are fully covered by the protrusions, whereby foreign materials can be reliably prevented from coming in the stator.

In the aspect of the present invention, the protrusions of the flange structure of at least one of the pair of bearings may be welded to the bottom plate of the first yoke.

With this structure, the bearing can be reliably prevented from coming off the first yoke.

Accordingly, in the stepping motor according to the present invention, the ratio of a volume of the coil can be maximized relative to the motor axial dimension thereby maximizing the motor torque, which is favorable when the stepping motor has an upper limits to its axial dimension.

DETAILED DESCRIPTION OF THE INVENTION

Exemplary embodiments of the present invention will be described with reference to the accompanying drawings.

Figure 1:
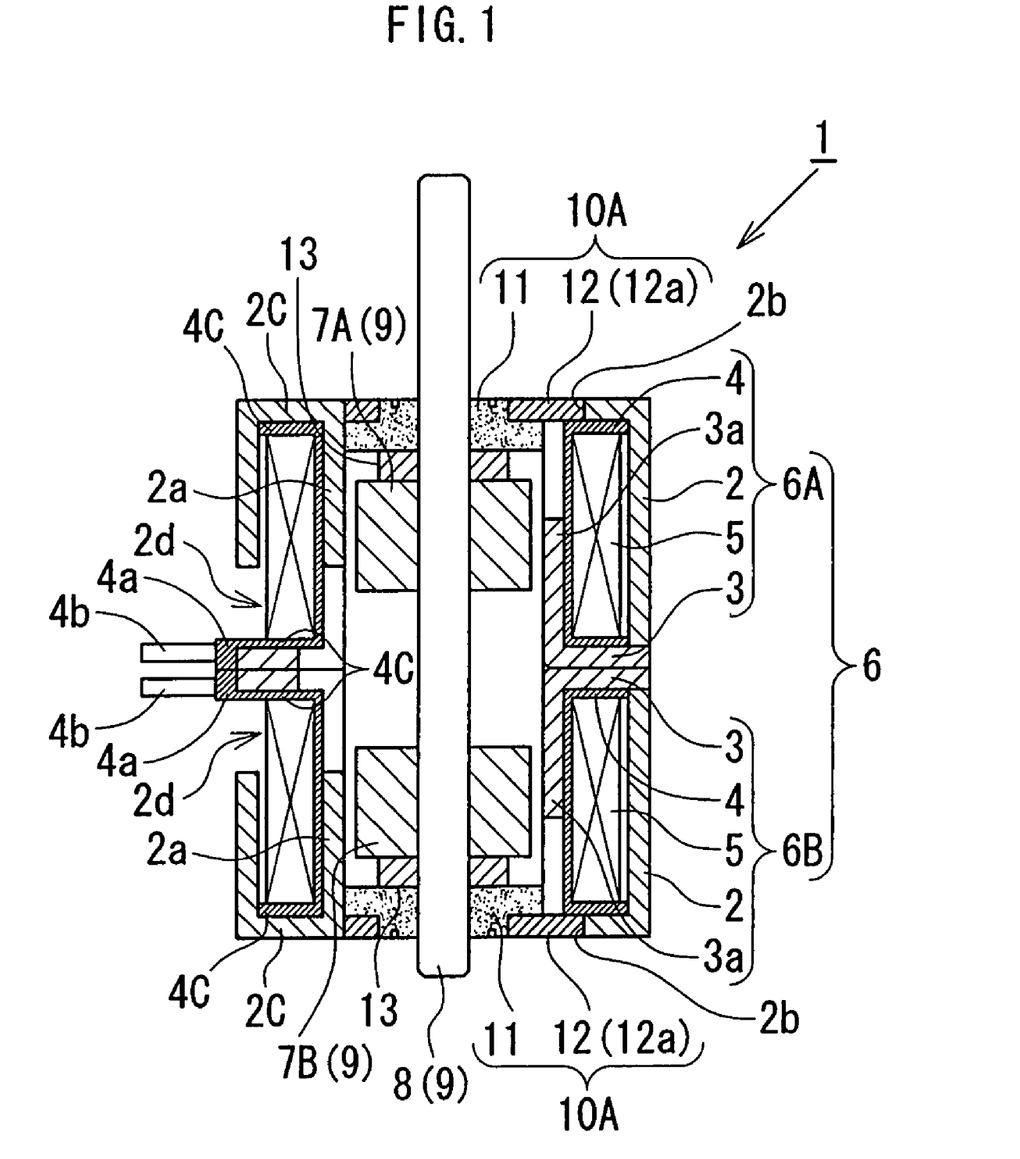
FIG. 1 is a schematic cross sectional view of a stepping motor according to a first embodiment of the present invention.
Figure 2:
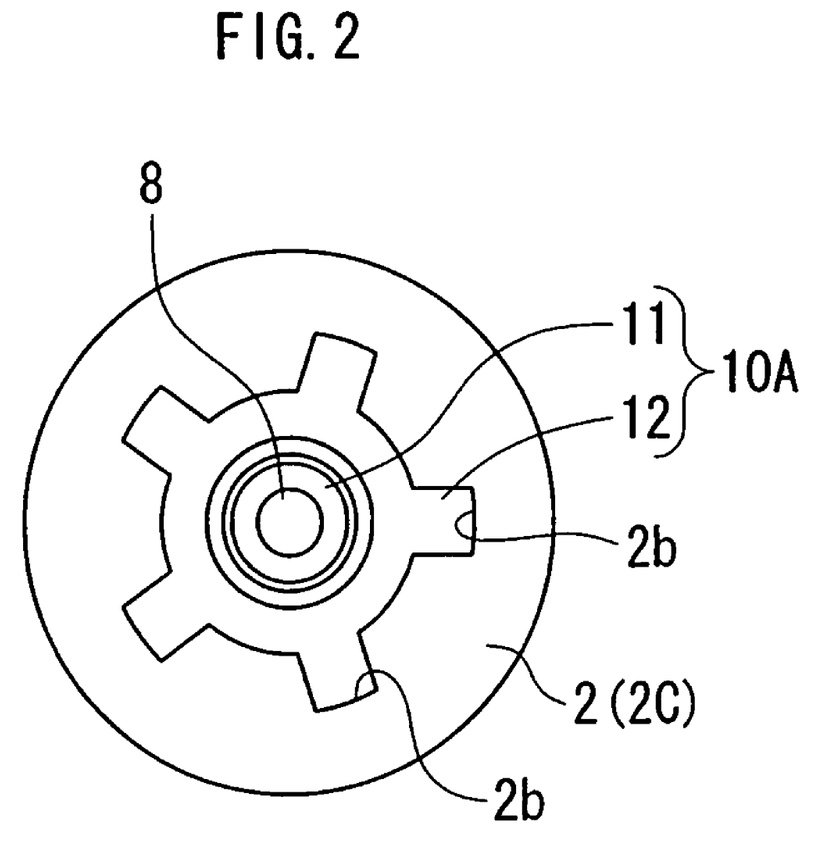
FIG. 2 is a top plan view of the stepping motor of FIG. 1.

A first embodiment of the present invention will be described with reference to FIGS. 1 to 9. Referring to FIG. 1, a stepping motor 1 according to the first embodiment basically includes a stator assembly 6 and a rotor assembly 9.

The stator assembly 6 is made up of two stators 6A and 6B which are structured identically with each other and each structured such that a coil 5 wound around a bobbin 4 is housed in an annular hollow space formed by coupling of a first yoke 2 (outer yoke) and a second yoke 3 (inner yoke) which have respective pluralities of pole teeth 2a and 3a intermeshing with each other, wherein the two stators 6A and 6B are put together back to back with a phase difference of 90 degrees (electrical angle) therebetween thereby generating a two-phase magnetic field.

The rotor assembly 9 is made up of a rotary shaft 8, and rotor magnets 7A and 7B fixedly attached to the rotary shaft 8. The outer circumferences of the rotor magnets 7A and 7B are multipole-magnetized in the circumferential direction. The rotor assembly 9 is housed in a cylindrical hollow space enclosed by the pluralities of pole teeth 2a and 3a of the stators 6A and 6B such that the outer circumferences of the rotor magnets 7A and 7B oppose the pole teeth 2a and 3a with a predetermined air gap therebetween. The rotary shaft 8 is rotatably supported by two bearings 10A attached to the respective first yokes 2 of the stators 6A and 6B.

The first and second yokes 2 and 3 of the stators 6A and 6B are all made of the same material, specifically a soft magnetic steel sheet material (such as an electromagnetic steel sheet, a silicon steel sheet, and a pure iron sheet), such that the steel sheet material is formed into a predetermined shape by drawing or pressing process, and then the pole teeth 2a and 3a are bent up at right angles.

The bobbin 4 is made of a synthetic resin material (such as liquid crystal polymer) and integrally includes a spool portion, two flanges 4c formed respectively at the both ends of the spool portion, and a terminal block 4a formed to extend from one of the flanges 4c. A magnet wire is wound around the spool portion with a predetermined number of turns thereby constituting the coil 5. Terminal pins 4b are implanted in the terminal block 4a, and the lead wires of the coil 5 are bound around the terminal pins 4b.

Figure 3:
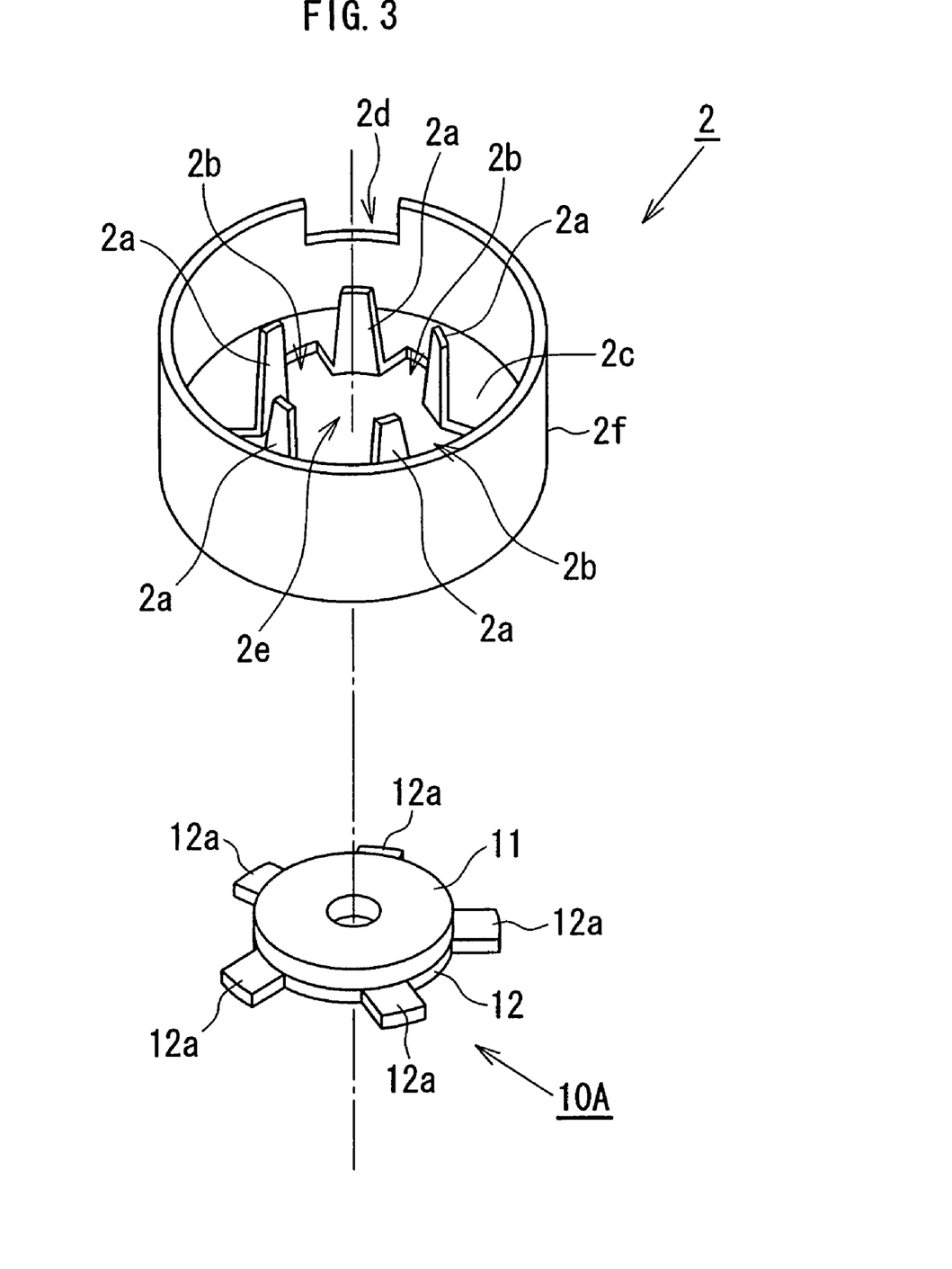
FIG. 3 is a perspective view of a first yoke and a bearing of the stepping motor of FIG. 1, taken apart from each other.

Referring to FIG. 3, the first yoke 2 and the bearing 10A for the stator 6B are taken apart from each other. The stator 6A is structured identically with the stator 6B as described above, and the description below applies to the stator 6A as well.

The first yoke 2 is formed into a cup-like shape and basically includes a hollow cylinder wall 2f, and a bottom plate 2c disposed to cover one end of the hollow cylinder wall 2f. The bottom plate 2c has a circular opening 2e formed at its center, and the pole teeth 2a are formed along the circumference of the opening 2e so as to extend parallel to the hollow cylinder wall 2f. A plurality of notches 2b are formed along the circumference of the opening 2e so as to extend radially and outwardly taking into consideration the strength of the first yoke 2. And, a cutout 2d is formed at the hollow cylinder wall 2f, and the terminal block 4b of the aforementioned bobbin 4 passes through the cutout 2d and stick out.

The bearing 10A includes a hollow-cylindrical main body 11, and a flange structure 12 composed of an annulus 12b and a plurality of protrusions 12a extending axially from the outer circumference of the annulus 12b and representing an interrupted flange. The main body 11 has its outer diameter dimensioned corresponding to the diameter of a circle defined by the inner faces of the plurality of pole teeth 2a of the first yoke 2 so that the main body 11 is engagingly fitted inside the opening 2e of the first yoke 2 at which time the protrusions 12a of the flange structure 12 engage with the notches 2b each formed between two adjacent pole teeth 2a of the first yoke 2, and the protrusions 12a are spot-welded to the bottom plate 2c of the first yoke 2, whereby the bearing 10A is fixed to the first yoke 2.

The shape of the protrusion 12a of the bearing 10A preferably corresponds to the shape of the notch 2b of the first yoke 2 so as not to form an air gap therebetween thus preventing dusts from coming in the stator assembly 6.

Figure 4:
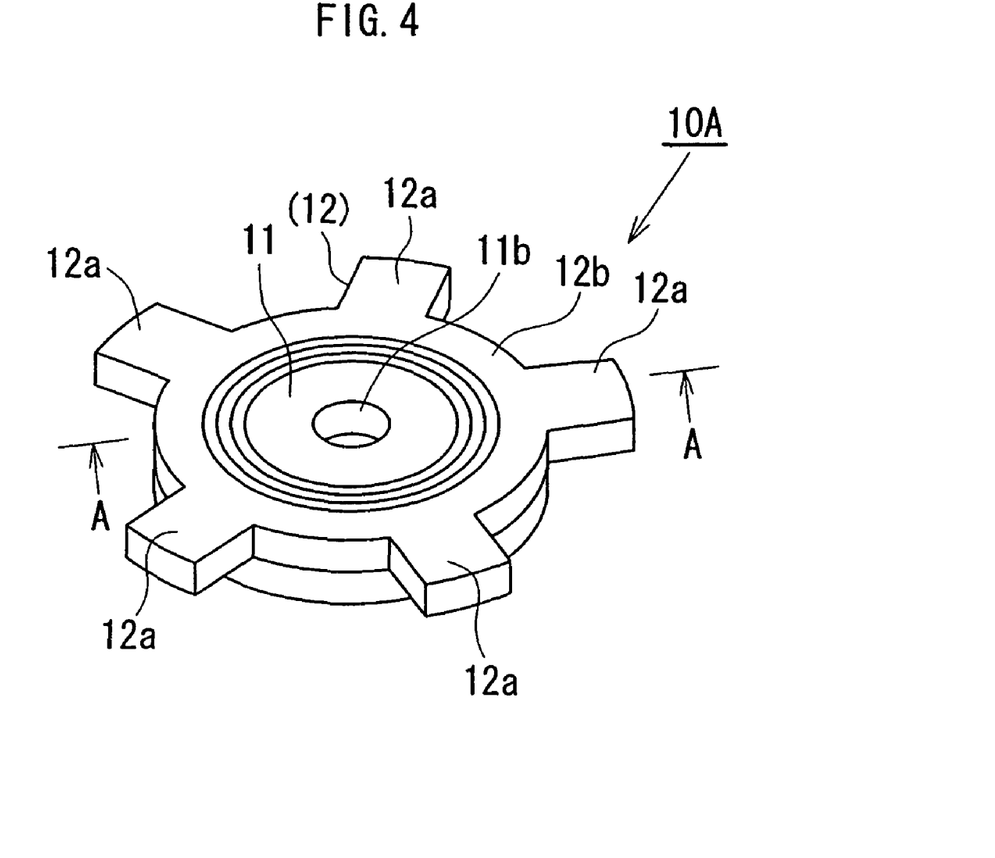
FIG. 4 is a perspective view of an example of a bearing for the first embodiment.

FIG. 4 shows an example bearing 10A for the stepping motor 1 of FIG. 1. The bearing 10 includes a hollow-cylindrical main body 11 having a large diameter portion and a small diameter portion, and a flange structure 12 which is formed discretely from the main body 11, composed of an annulus 12b and a plurality of protrusions 12a extending axially outwardly from the outer circumference of the annulus 12b, and which is engaged with the small diameter portion of the main body 11. The main body 11 is made of a sintered oil-impregnated copper alloy, and the flange structure 12 is made of an iron steel material.

The protrusions 12a have a thickness equal to or smaller than the thickness of the bottom plate 2c of the first yoke 2, are shaped to engage with the notches 2b of the bottom plate 2c, and are formed at such a position that one end surface of the main body 11 does not protrude axially outwardly beyond the bottom plate 2c when the protrusions 12a are in contact with the flange 4c of the bobbin 4 which contains the coil 5 and which is housed in the annular hollow space formed by the first and second yokes 2 and 3.

Figure 5:
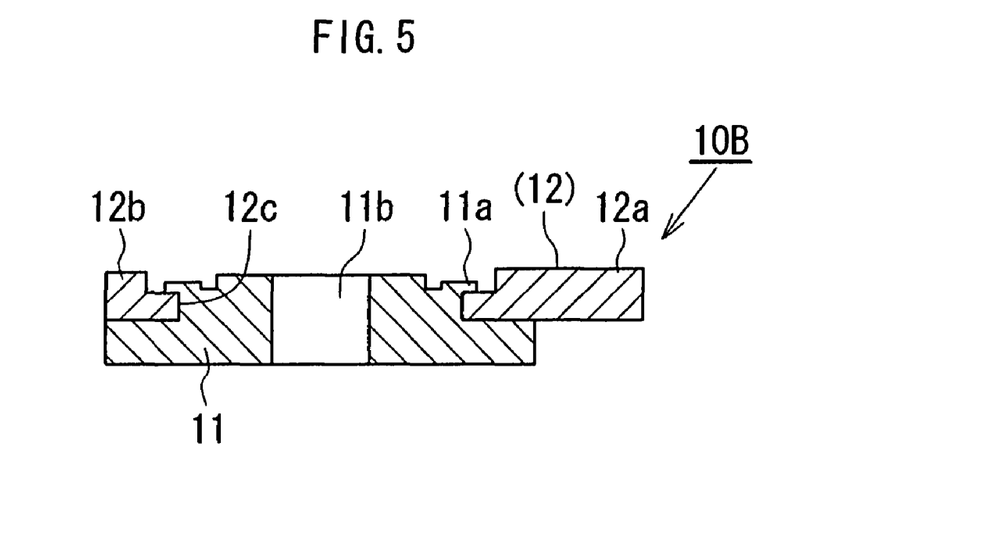
FIG. 5 is a cross sectional view of the bearing of FIG. 4, taken along line A-A.

Referring FIG. 5 showing a cross sectional view of the bearing 10A of FIG. 4, taken along line A-A, a rim 11a is formed at the outer circumference of the small portion of the main body 11. When the annulus 12b of the flange structure 12 is engaged with the small portion of the main body 11, an inner circumference 12c of the annulus 12b is hooked to the rim 11a, and then the rim 11a is worked on with a tool (not shown) thereby securely fixing the flange structure 12 to the main body 11. The flange structure 12, when fixed to the main body 11, has its one end surface set flush with one end surface of the main body 11. The main body 11 has a center hole 11b, through which the rotary shaft 8 passes.

The flange structure 12 is made of an iron steel material in the present embodiment, but may alternatively be made of a resin material (for example, polybutylene terephthalate (PBT)), and polyphenylene sulfide (PPS)). In this case, the main body 11 and the flange structure 12 can be formed integrally with each other by resin molding.

Description will now be made on the assembling procedure for the stepping motor 1.

The first yoke 2 of the stator 6B is sleeved over a tool (not shown) prepared to the inner diameter of the stator assembly 6, thus the tool is disposed through the inner circumference formed by the pole teeth 2a of the first yoke 2, and the bobbin 4 having the coil 5 therearound is set in the first yoke 2 with the terminal block 4a sticking out through the cutout 2d formed at the hollow cylinder wall 2f. The second yoke 3 of the stator 6B is sleeved over the tool (not shown), thus the tool is disposed through the inner circumference formed by the pole teeth 3a of the second yoke 3, and the second yoke 3 is coupled to the first yoke 2 such that the pole teeth 3a of the second yoke 3 intermesh with the pole teeth 2a of the first yoke 2 at a circumferential plane, wherein the pole teeth 2a of the first yoke 2 and the pole teeth 3a of the second yoke 3 are shifted from each other with a phase difference by an electrical angle of 180 degrees.

Then, the second yoke 3 of the stator 6A is sleeved over the tool (not shown), thus the tool is disposed through the inner circumference formed by the pole teeth 3a of the second yoke 3, the bobbin having the coil 5 therearound is set in the second yoke 3 of the stator 6A, and the first yoke 2 of the stator 6A is sleeved over the tool (not shown), thus the tool is disposed through the inner circumference formed by the pole teeth 2a of the first yoke 2, and the first yoke 2 is coupled to the second yoke 3 such that the pole teeth 2a of the first yoke 2 intermesh with the pole teeth 3a of the second yoke 3 at a circumferential plane, wherein the pole teeth 2a of the first yoke 2 and the pole teeth 3a of the second yoke 3 are shifted from each other with a phase difference by an electrical angle of 180 degrees. In this connection, the terminal block 4a of the bobbin 4 is disposed to stick out through the cutout 2d of the hollow cylinder wall 2f as in the stator 6B.

The stators 6A and 6B are coupled to each other in a back-to-back manner with their respective phases shifted from each other by an electrical angle of 90 degrees, and are welded to each other, thus the stator assembly 6 with two phases is made up of the stators 6A and 6B disposed coaxially.

Next, the bearing 10A is attached to the first yoke 2 of the stator 6B in such a manner that the large diameter portion of the main body 11 is engaged into the opening 2e defined by the inner faces of the pole teeth 2a of the first yoke 2 with the protrusions 12a of the flange structure 12 engaging with the notches 2b each formed between two adjacent pole teeth 2a. At this process, the flange 4c of the bobbin 4 makes contact with the protrusions 12a thereby working as a stopper of the bearing 10A with respect to the axial direction. And, the protrusions 12a are welded to the bottom plate 2c of the first yoke 2 thereby fixing the bearing 10A to the first yoke 2 of the stator 6B.

The rotor magnets 7A and 7B are fixed at predetermined locations of the rotary shaft 8 and are multipole-magnetized at their outer circumferences thus making up the rotor assembly 9, the rotor assembly 9 thus made up is inserted through the opening 2e of the stator 6A and then through the opening 2e of the stator 6B, and one end portion of the rotary shaft 8 close to the rotor magnet 7B is inserted through the hole 11b of the bearing 10A, whereby the rotor assembly 9 is substantially housed in the cylindrical hollow space enclosed by the pole teeth 2a and 3a of the stators 6A and 6B. In this connection, a plastic washer 13 having slidability is provided between the bearing 10A and the rotor magnet 7B as required.

Another bearing 10A is sleeved over the other end portion of the rotary shaft 8, the large diameter portion of the bearing 10A is engaged into the opening 2e defined by the inner faces of the pole teeth 2a of the first yoke 2 of the stator 6A with the protrusions 12a of the flange structure 12 engaging with the notches 2b, thus the bearing 10A is attached to the first yoke 2 of the stator 6A. Again, a plastic washer 13 having slidability may be provided between the bearing 10A and the rotor magnet 7A as required, and the flange 4c of the bobbin 4 makes contact with the protrusions 12a thereby working as a stopper of the bearing 10A with respect to the axial direction. In FIG. 1, the rotor assembly 9 includes two magnets (7A and 7B), but may alternatively incorporate one magnet.

As for the stator 6B, the protrusions 12a of the bearing 10A may be welded to the bottom plate 2c of the first yoke 2 as described above. On the other hand, as for the stator 6A, if a front plate (not shown) as a motor attachment member is attached to the bottom plate 2c of the first yoke 2, the protrusions 12a do not have to be welded to the bottom plate 2c of the first yoke 2 because the bearing 10A is held down by the front plate (not shown).

With the assembling procedure described above, the stepping motor 1 is completed, in which the rotor assembly 9 is disposed inside the stator assembly 6 such that the pole teeth 2a and 3a of the stator assembly 6 oppose the outer circumferences of the rotor magnets 7A and 7B with a predetermined air gap therebetween.

The stepping motor 1 according to the first embodiment of the present invention provides the following advantages.

Since the plurality of protrusions 12a of the bearing 10A engage respectively with the plurality of notches 2b of the bottom plate 2c of the first yoke 2, the bearing 10A is reliably prevented from rotating with respect to the first yoke 2.

The plurality of protrusions 12a of the bearing 10A, which engage with the plurality of notches 2b of the bottom plate 2c of the first yoke 2, are brought into contact with the flange 4c of the bobbin 4 housed in the annular hollow space formed by the first and second yokes 2 and 3, whereby it is ensured that the bearing 10A can be precisely located relative to the first yoke 2 with respect to the axial direction.

Also, since the bearing 10A is configured such that any portions of the main body 11 and the flange structure 12 do not protrude axially outwardly beyond the bottom plate 2c of the first yoke 2 when the protrusions 12a engage with the notches 2b, the axial ends of the stepping motor 1 are defined by the outer faces of the bottom plates 2c of the first yokes 2 of the stators 6A and 6B. This structure increases the axial dimension of the annular hollow space formed by the first and second yokes 2 and 3 thus allowing the occupied volume ratio of the coil 4 to be increased, which is favorable for a motor having an upper limit to its axial dimension.

Further, since the large diameter portion of the main body 11 of the bearing 10A fits engagingly into the opening 2e defined by the inner faces of the pole teeth 2a of the first yoke 2, the bearing 10A can be stably held with respect to the first yoke 2.

Thus, when the protrusions 12a of the bearing 10A engage with the notches 2b of the bottom plate 2c of the first yoke 2, it is ensured that any portions of the main body 11 and the flange structure 12 of the bearing 10A do not protrude axially outwardly beyond the outer face of the bottom plate 2c of the first yoke 2 while the bearing 10A is prevented from rotating relative to the first yoke 2 and at the same time precisely positioned with respect to the axial direction.

Moreover, since the main body 11 and the flange structure 12 for the bearing 10A are discrete components, optimum manufacturing methods can be used respectively for the main body 11 and the flange structure 12 thereby facilitating production of the both portions to be put together for the bearing 10A.

When the main body 11 is made of a sintered oil-impregnated alloy material, lubricity for the rotation of the rotary shaft 8 of the rotor assembly 9 can be assured, and if a sintered oil-impregnated copper alloy is used for the material, then sliding noises from the rotary shaft 8 can be reduced better than when using a sintered oil-impregnated iron alloy.

When the flange structure 12 including the annulus 12b and the protrusions 12a is made of an iron steel material, the protrusions 12a can be easily welded to the first yoke 2 made of an iron steel material.

Also, since the protrusions 12a of the bearing 10A are shaped corresponding to the shape of the notches 2b of the bottom plate 2c of the first yoke 2, when the protrusions 12a are engaged with the notches 2b, the protrusions 12a cover tightly the notches 2b thereby preventing foreign particles like dusts from coming in the stator assembly 6. In this connection, if foreign particles are otherwise prevented from coming in the stator assembly 6, the protrusions 12 do not necessarily have to be shaped corresponding to the shape of the notches 2b.

Further, since the protrusions 12a of one or both of two of the bearings 10A are welded to the bottom plate 2c of the first yoke 2, the bearing 10A can be reliably prevented from coming off the first yoke 2.

In the present embodiment, the flange structure 12 is made of an iron steel material, but the present invention is not limited in this respect to any specific material, and the flange structure 12 may be made of a resin material (for example, polybutylene terephthalate (PBT)), and polyphenylene sulfide (PPS)), in which case the main body 11 and the flange structure 12 can be formed integrally with each other by resin molding. When the flange structure 12 is made of a resin material, the protrusions 12a of the bearing 10A are engaged with the notches 2b of the bottom plate 2c of the first yoke 2, and are heated and pressed to be deformed, whereby the notches 2b can be fully covered, and at the same time the bearing 10A can be firmly attached.

Figure 6:
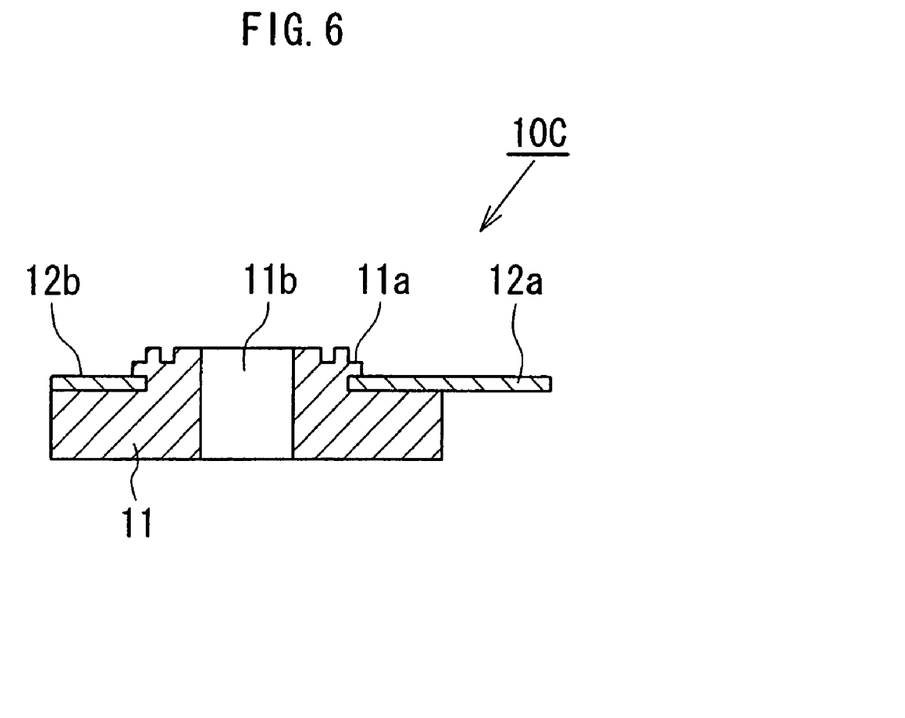
FIG. 6 is a cross sectional view of another example of a bearing for the first embodiment.
Figure 7:
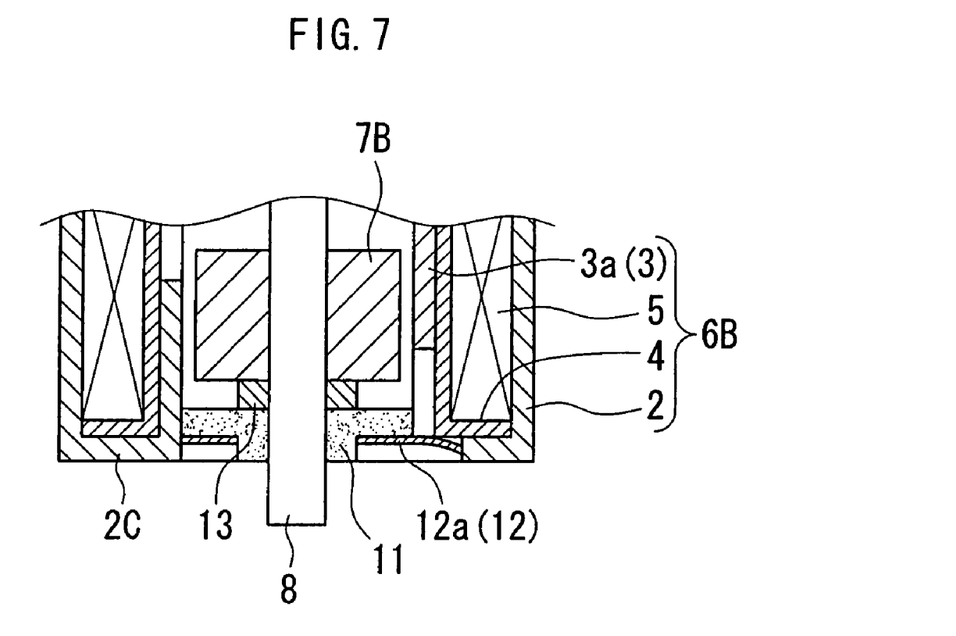
FIG. 7 is a cross sectional view of a relevant part of a stepping motor incorporating the bearing of FIG. 6.

FIG. 6 shows another example bearing 10C adapted for the first embodiment, and FIG. 7 shows how the bearing 10C is disposed.

The bearing 10C includes a main body 11 structured identically with the main body 11 of the bearing 10A of FIGS. 4/5 described above, and a flange structure 12. The flange structure 12 of the bearing 10C has a shape substantially identical with the shape of the flange structure of the bearing 10A but is made of a thin sheet metal, such as a stainless steel sheet, having a thickness of some 0.1 mm and having a spring force. The radial dimension of the protrusions 12a is set larger by about 0.1 mm than the radial dimension of the notches 2b of the bottom plate 2c of the first yoke 2, and when the protrusions 12a are fitted in the notches 2b for attaching the bearing 10C to the first yoke 2, the protrusions 12a are deformed as shown in FIG. 7. Under the conditions, when an axial outward force is applied to the bearing 10C, the protrusions 12a deformed function like braces thereby preventing the bearing 10C from coming off the first yoke 2.

Figure 8:
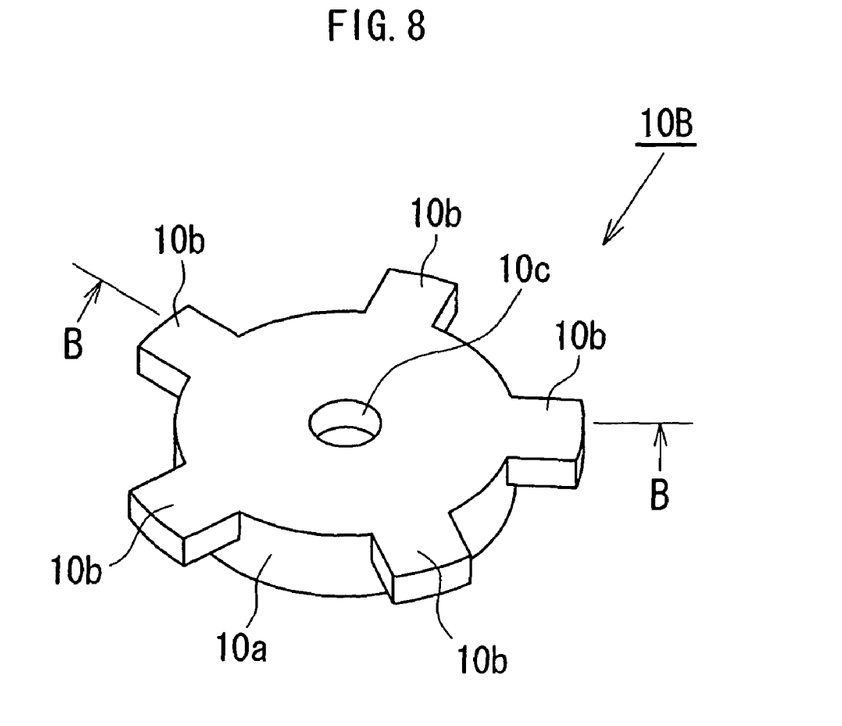
FIG. 8 is a perspective view of still another example of a bearing for the first embodiment.
Figure 9:
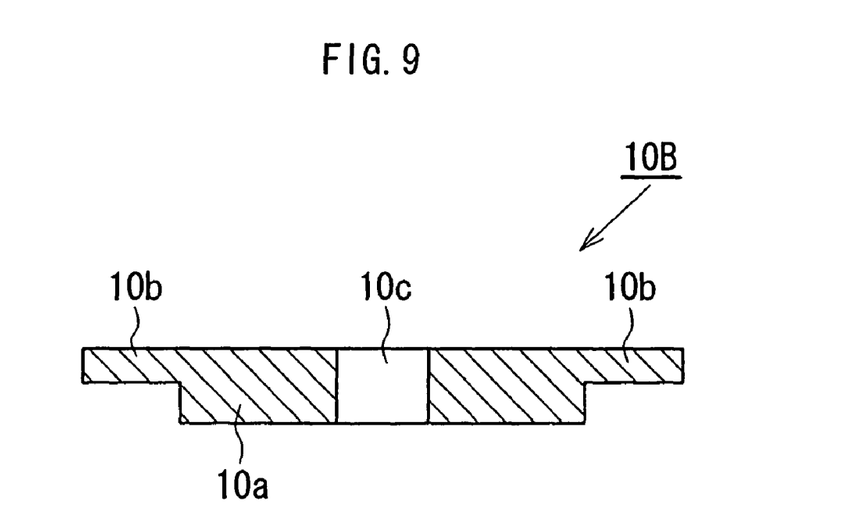
FIG. 9 is a cross section view of the bearing of FIG. 8, taken along line B-B.

FIGS. 8 and 9 show still another example bearing 10B adapted for the first embodiment.

The bearing 10B integrally includes a hollow-cylindrical main body 10a and a plurality of protrusions 10b extending radially outwardly from the main body 10a. The main body 10a has a hole 10c at its center, and the rotary shaft 8 goes through the hole 10c. The bearing 10B is made of a sintered oil-impregnated iron alloy. The bearing 10B is fixedly attached to the first yoke 2 in the same manner as the bearing 10A, such that the main body 10a is engagingly fitted into the opening 2e defined by the pole teeth 2a of the first yoke 2 with the protrusions 10b engaging with the notches 2b formed between two adjacent pole teeth 2a, and the protrusions 10b are welded to the bottom plate 2c of the first yoke 2.

Since the bearing 10C is integrally composed of the main body 10a and the protrusions 10b both of which are made of a sintered oil-impregnated iron alloy, the number of components can be reduced, and also the bearing 10B described above can be easily welded to the first yoke 2 made of an iron steel material thereby achieving a reliable connection.

When a mounting plate (not shown) for attaching a motor to a device is attached to the stepping motor 1, a tool (not shown) is set to the rotary shaft 8, the mounting plate is placed on the stator 6A (specifically on the bottom plate 2c of the first yoke 2) with reference to the tool and welded to the first yoke 2. Thus, since the mounting plate is attached to the stepping motor 1 after the stepping motor 1 is completed, the motor production procedure can be standardized for various mounting plates in different shapes, and at the same time the motor structure can be also standardized.

A second embodiment of the present invention will be described with reference to FIGS. 10 and 11. In explaining the second embodiment of FIGS. 10 and 11, any component parts identical with or corresponding to those in the first embodiment are denoted by the same reference numerals, and a detailed description thereof will be omitted below.

Figure 10:
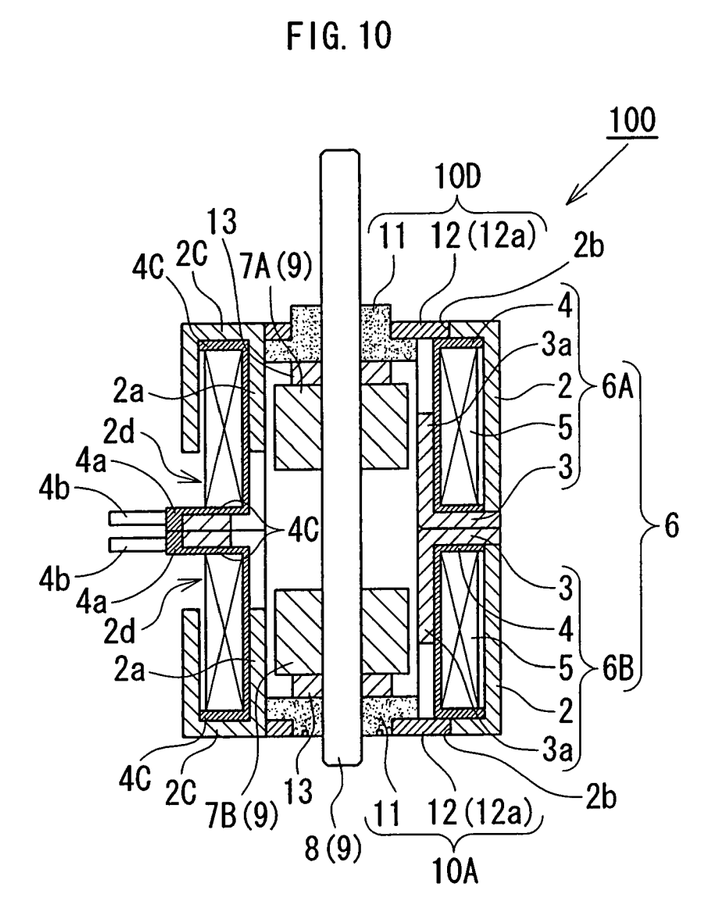
FIG. 10 is a schematic cross sectional view of a stepping motor according to a second embodiment of the present invention.
Figure 11:
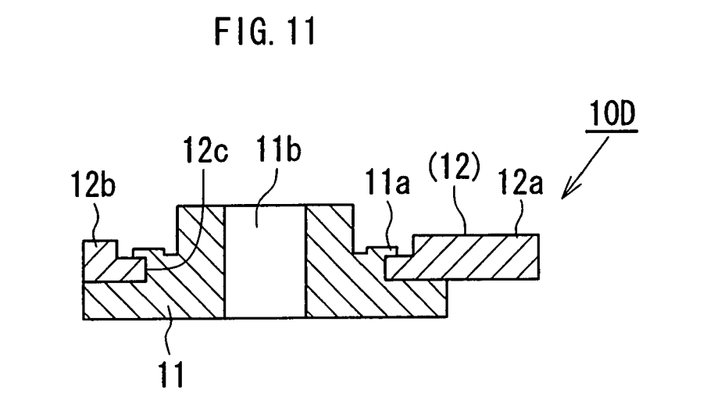
FIG. 11 is a cross sectional view of a bearing of the stepping motor of FIG. 10.

Referring to FIG. 10, a stepping motor 100 according to the second embodiment includes a bearing 10A which is structured identically with the bearing 10A of FIG. 1 and disposed in a stator 6B, and a bearing 10D which is different from the bearing 10A and disposed in a stator 6A. Referring to FIG. 11, the bearing 10D attached to a first yoke 2 of the stator 6A differs from the bearing 10A only in that the axial outer end (upper side in the figure) of the main body 11 is elevated compared to the outer faces of the protrusions 12a, rather than being flush therewith (refer to FIG. 5). That is to say, the bearing 10D has a larger axial dimension, for example by about 0.3 mm, than the bearing 10A, and when the bearing 10D is set in the first yoke 2 with the protrusions 12a making contact with a flange 4c of a bobbin 4, the elevated part of the main body 11 of the bearing 10D protrudes axially outwardly beyond a bottom plate 2c of the first yoke 2.

Accordingly, when a mounting plate (not shown) for attaching a motor to a device is attached to the stepping motor 100, the mounting plate is set on the bottom plate 2c of the first yoke 2 of the stator 6A in place with reference to the elevated part of the main body 11 which protrudes beyond the bottom plate 2c, and then is welded to the first yoke 2.

Thus, since the mounting plate is attached to the stepping motor 100 after the stepping motor 100 is completed, the motor production procedure can be standardized for various mounting plates in different shapes, and at the same time the motor structure can be also standardized. In this connection, the protruding dimension of the main body 11 of the bearing 10D should be only as large as necessary to work as reference for setting a mounting plate in place.

In the second embodiment, the stepping motor 100 incorporates two different bearings, specifically the bearing 10A in the stator 6B and the bearing 10D in the stator 6A, but the present invention is not limited to such a bearing arrangement and the stepping motor 100 may alternatively incorporate two of the bearings 10D in both the stators 6A and 6B insofar as the resulting increase in axial dimension does not cause inconveniences. With this alternative bearing arrangement, the number of components can be reduced, and also the stators 6A and 6B are structured identically with each other thus facilitating the production procedure.

Description will be omitted on the other advantages of the second embodiment that are the same as those of the first embodiment.

While the present invention has been illustrated and explained with respect to specific embodiments thereof, it is to be understood that the present invention is by no means limited thereto but encompasses all changes and modifications that will become possible within the scope of the present invention.

What is claimed is:

1. A stepping motor comprising:
 a stator comprising
  a first yoke having a cup-like configuration comprising a hollow cylinder wall and a bottom plate to cover one end of the hollow cylinder wall, the bottom plate having (1) a circular opening formed at its center, (2) a first plurality of pole teeth formed along a circumference of the circular opening and extending axially parallel to the hollow cylinder wall, and (3) a plurality of notches formed to extend radially outwardly from the circumference of the circular opening, each of the notches being located between two adjacent pole teeth,
  a second yoke having a second plurality of pole teeth disposed to intermesh with the first plurality of pole teeth of the first yoke on a same circumferential plane, the second yoke, together with the first yoke, forming an annular hollow space,
  a coil, and
  a bobbin having the coil wound therearound and being housed in the annular hollow space formed by the first and second yokes;
 a rotor rotatably disposed in a cylindrical hollow space enclosed by the first and second pluralities of pole teeth of the stator, the rotor comprising
  a shaft, and
  a magnet fixed on the shaft; and
 a pair of bearings disposed to sandwich the magnet of the rotor, each of the bearings attached to the first yoke of the stator, wherein the bearing comprises a hollow-cylindrical main body, and a flange structure comprising a plurality of protrusions to extend radially outwardly, to engage with the plurality of notches of the bottom plate of the first yoke, and to be disposed in contact with the bobbin, and
 wherein the circular opening is further defined by inner faces of the first plurality of pole teeth of the first yoke, and
 the hollow-cylindrical main body is fitted inside the further defined circular opening.

2. A stepping motor according to claim 1, wherein the main body of each of the pair of bearings has its outer diameter so determined as to engagingly fit in the circular opening of the bottom plate of the first yoke, and the protrusions of the flange structure of each bearing have a thickness at most equal to a thickness of the bottom plate of the first yoke and are disposed at least flush with an axially outer end face of the main body whereby any portions of the bearing are prohibited from protruding axially outwardly beyond the bottom plate of the first yoke when the protrusions of each bearing are disposed in contact with the bobbin.

3. A stepping motor according to claim 1, wherein the main body of one of the pair of bearings has its outer diameter so determined as to engagingly fit in the circular opening of the bottom plate of the first yoke, and the protrusions of the flange structure of the one bearing have a thickness at most equal to a thickness of the bottom plate of the first yoke and are disposed at least flush with an axially outer end face of the main body of the one bearing whereby any portions of the one bearing are prohibited from protruding axially outwardly beyond the bottom plate of the first yoke when the protrusions of the one bearing are disposed in contact with the bobbin, and wherein the main body of the other of the pair of bearings has its outer diameter so determined as to engagingly fit in the circular opening of the bottom plate of the first yoke, the protrusions of the flange structure of the other bearing have a thickness at most equal to a thickness of the bottom plate of the first yoke, and the main body of the other bearing has its axial dimension so determined that an axially outer end face of the main body of the other bearing protrudes axially outwardly beyond the bottom plate of the first yoke when the protrusions of the other bearing are disposed in contact with the bobbin.

4. A stepping motor according to claim 1, wherein the main body and the flange structure of the bearing are formed discretely from each other such that the main body is made of a sintered oil-impregnated alloy, and that the flange structure further comprises an annulus to engage the main body and is made of a steel material.

5. A stepping motor according to claim 1, wherein the main body and the flange structure of the bearing are formed into an integral body made of a sintered oil-impregnated iron alloy.

6. A stepping motor according to claim 1, wherein the main body and the flange structure of the bearing are formed discretely from each other such that the main body is made of a sintered oil-impregnated alloy, and that the flange structure further comprises an annulus to engage the main body, is made of a resin material by resin molding, and united with the main body when resin-molded.

7. A stepping motor according to claim 1, wherein the main body and the flange structure of the bearing are formed discretely from each other such that the main body is made of a sintered oil-impregnated alloy, and that the flange structure further comprises an annulus to engage the main body and is made of a thin steel sheet having a spring force, and wherein a circle formed by circularly connecting distal end points of the protrusions of the flange structure of the bearing has a slightly larger diameter than a circle formed by circularly connecting bottom end points of the notches of the bottom plate of the first yoke.

8. A stepping motor according to claim 1, wherein the protrusions of the flange structure of the bearing have a shape identical with a shape of the notches of the bottom plate of the first yoke.

9. A stepping motor according to claim 1, wherein the protrusions of the flange structure of at least one of the pair of bearings are welded to the bottom plate of the first yoke.

* * * * *